US012754279B2

(12) United States Patent
Sanson et al.

(10) Patent No.: US 12,754,279 B2
(45) Date of Patent: Oct. 6, 2026

(54) INTERFERENCE MITIGATION IN HIGH RESOLUTION RADARS

(71) Applicant: GM Cruise Holdings LLC, San Francisco, CA (US)

(72) Inventors: Jessica Bartholdy Sanson, Munich (DE); Johanna Gütlein-Holzer, Taufkirchen (DE); Gustavo Adolfo Guarín Aristizabal, Munich (DE); Jorge Julio Jácome Muñoz, Munich (DE); Andreas Barthelme, Munich (DE); Kalin Hristov Kabakchiev, Munich (DE); Andre Giere, Oberpframmern (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 592 days.

(21) Appl. No.: 18/305,306

(22) Filed: Apr. 21, 2023

(65) Prior Publication Data

US 2024/0353524 A1 Oct. 24, 2024

(30) Foreign Application Priority Data

Apr. 18, 2023 (EP) .................................... 23168551

(51) Int. Cl.
*G01S 7/02* (2006.01)
*G01S 13/536* (2006.01)
*G01S 13/56* (2006.01)

(52) U.S. Cl.
CPC .......... *G01S 7/0233* (2021.05); *G01S 13/536* (2013.01); *G01S 13/56* (2013.01)

(58) Field of Classification Search
CPC ....... G01S 7/0233; G01S 13/536; G01S 13/56
See application file for complete search history.

(56) References Cited

U.S. PATENT DOCUMENTS

| | | | | |
|---|---|---|---|---|
| 11,804,882 | B1 * | 10/2023 | Shattil | H04J 13/0003 |
| 2019/0265347 | A1 | 8/2019 | Wintermantel | |
| 2022/0317285 | A1 * | 10/2022 | Wang | G01S 13/343 |
| 2023/0047968 | A1 | 2/2023 | Jácome Muñoz et al. | |
| 2023/0305132 | A1 * | 9/2023 | Subburaj | G01S 13/343 |
| 2024/0353553 | A1 * | 10/2024 | Gudinetsky | G01S 7/356 |

FOREIGN PATENT DOCUMENTS

EP 4130789 A1 2/2023

OTHER PUBLICATIONS

"Extended European Search Report for European Patent Application No. 23168551.2", Mailed Date: Oct. 10, 2023, 7 pages.

* cited by examiner

*Primary Examiner* — Vladimir Magloire
*Assistant Examiner* — Eric K Hodac
(74) *Attorney, Agent, or Firm* — CANTOR COLBURN LLP

(57) ABSTRACT

A radar system comprises a plurality of transmit antennas that transmit a radar signal toward a target, wherein respective transmit antennas are assigned a transmitter-specific phase offset via which the radar signal is modulated, and wherein respective phase offsets correspond to an offset in velocity of a target. The system further comprises a plurality of receive antennas that receive comprising transmitted signals reflected by the target, and one or more processors configured to determine whether a peak signal is present for respective transmitted signals reflected by the target, the peak signals corresponding to perceived velocities at which the target is moving.

20 Claims, 12 Drawing Sheets

INTERFERENCE MITIGATION IN HIGH RESOLUTION RADARS

BACKGROUND

In radar systems, interference can occur when any signal or energy that enters the receiver's front-end causes unwanted noise and reduces the system's overall performance. Interference can be caused by several factors, including external sources such as other radars, communication systems, power lines, and even natural phenomena such as lightning and solar flares.

The effects of interference on a high-resolution radar system can be severe, leading to reduced performance and increased false positives in the system's output. One of the most significant effects of interference is a decrease in the system's sensitivity. Interference can overwhelm the receiver's front-end, making it more difficult for the radar to detect weak signals, resulting in a reduced range and resolution. This decrease in sensitivity can cause objects to be missed, leading to false readings or a failure to detect objects entirely.

Another effect of interference is a decrease in the system's signal-to-noise ratio (SNR). The SNR is a measure of the strength of the desired signal compared to the level of background noise. Interference can increase the noise floor, which in turn decreases the SNR, making it harder to distinguish between the desired signal and background noise. This can result in false alarms, incorrect object classification, and missed detections.

In conventional autonomous driving systems, due to an increase in the number of radar systems deployed per vehicle and the number of such vehicles, interference among vehicular radar systems is an issue that has yet to be satisfactorily addressed.

SUMMARY

The following is a brief summary of subject matter that is described in greater detail herein. This summary is not intended to be limiting as to the scope of the claims.

Described herein are various technologies relating to mitigating interference in high resolution radar systems. According to various aspects, both frequency and time division are employed, together with a code doppler multiplexing modulation. The total bandwidth over which a signal is to be transmitted is divided into smaller bands, and the signal is transmitted with randomly selected carrier frequencies and time slots, in order to cover the entire bandwidth referenced above. The random allocation of the frequency and time spectrum for the radar ramp/pulses decreases the probability of interference. In addition, doppler code modulation is used to ensure that if there is interference, the interference is not coherent.

With more particularity, various technologies described herein facilitate providing a frequency and time division radar network with doppler code multiplexing modulation, where random frequency and time allocation access are used for mutual radar interference mitigation. The described systems and methods can operate without any synchronization and cooperation between radars (also referred to herein as radar systems and/or radar sensors). The random frequency and time allocation decreases the probability of radars transmitting on the same frequency at the same time, reducing the probability of interference and limiting any interference that does occur to only part of the signal. In order to achieve this, the total bandwidth over which a signal can be transmitted (ramp or pulse) is divided into smaller subbands with relatively small bandwidths that are randomly selected from the subbands. These signals transmitted over multiple subbands are integrated during the radar range/doppler estimation so that the range estimation is provided by the full band coverage of all pulses/ramps.

In addition, the doppler code modulation makes the interference between radars not coherent, which results in an almost complete mitigation of the interference. Moreover, the range resolution obtained in processing is equivalent to the resolution provided by wide bandwidth, but with a much smaller baseband bandwidth of transmitted and received signals, thereby using a much smaller analog-to-digital (ADC) rate, providing an increase in unambiguous velocity, and improving range migration compensation for detectability of weak targets.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
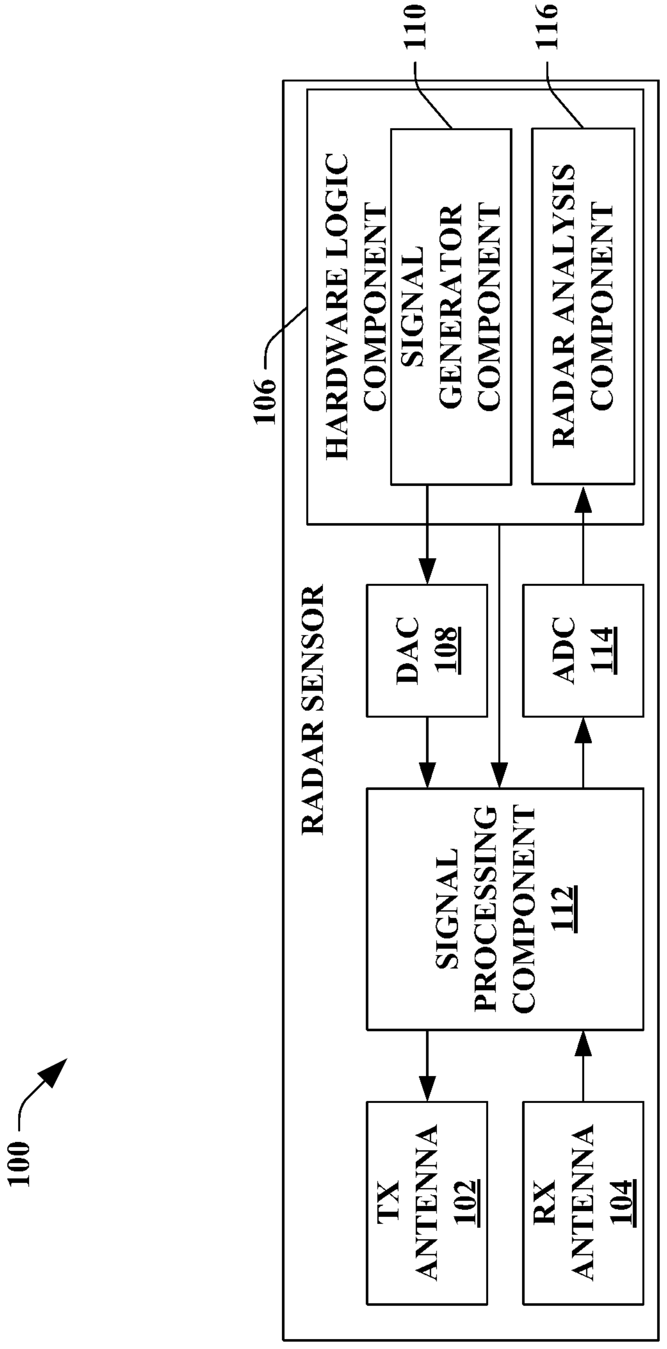
FIG. 1 is a functional block diagram of an exemplary radar sensor.

Various technologies pertaining to mitigating interference in high resolution radar systems are described herein. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With regard to the problems solved by the aspects disclosed herein, interference between radars has not been satisfactorily addressed in the autonomous driving sector. Radars need to split frequency and time resources so that the radars can operate without interfering with each other. In addition, autonomous driving systems need radars capable of operating with a high range, velocity, and angle resolution, which requires each radar to use large amounts of frequency and time resources during its operation. Moreover, achieving a high range resolution simultaneously with high unambiguous velocity estimation in radars is a significant challenge due to hardware limitations. Since high range resolution typically involves higher bandwidth, and the high unambiguous velocity span requires a low pulse repetition interval (PRI), a high ADC sampling rate is needed to provide high range resolution and high unambiguous velocity estimation.

To overcome these problems and others, the described aspects provide multiple techniques reducing the probability of interference in ramps/pulses transmitted and provide a significant reduction of the spectrum and required data throughput without significantly affecting the data quality. In addition, the use of Doppler code modulation makes the interference between the network radars not coherent.

The described systems and methods employ time-frequency-division with doppler multiplexing modulation for interference mitigation in high resolution radar networks. The techniques described herein reduce the amount of bandwidth needed by using a random allocation of frequency and time between the radars, reducing the probability of interference. The spectrum (e.g., the desired bandwidth (BW) to be covered) is divided into smaller subbands that are used during the radar measurement, thereby reducing the total BW/spectrum used in one ramp or pulse of the modulated radar signal.

Other features of the described aspects provide for: randomization of the center frequency offsets of the radar signal with reduced BW to cover the desired BW within one radar cycle; signal processing to calculate the radar data cube with range resolution equivalent to the range resolution achieved with the entire covered BW; amongst others. As the energy of the signal is spread over frequency and over time, interference with other users of the spectrum and of the field of view are improved. The described aspects do not compromise the radar system in terms of sidelobes, dynamic range, resolution, etc., and improve the accuracy of the unambiguous velocity estimation.

By using Doppler code multiplexing, all transmitters on a radar can operate at the same time and frequency, thus reducing the spectrum used. The different Doppler modulation codes ensure that if there is any interference, it is not coherent. In addition, the non-uniform code between a transmitter used in doppler multiplexing together with the processing proposed in various aspects described herein ensures that the maximum ambiguous speed of the radar is not compromised with the use of doppler multiplexing.

With reference now to FIG. 1, an exemplary radar sensor (also referred to as a radar system) 100 is illustrated, in which various features, circuits, etc. described herein can be employed. The radar sensor 100 includes a transmit antenna 102, a receive antenna 104, and a hardware logic component 106. Briefly, the hardware logic component 106 is configured to prepare radar signals that are transmitted by the transmit antenna 102, and to compute target solutions indicating estimated positions and/or velocities of objects based upon radar returns received by the receive antenna 104. In exemplary embodiments, various components of the radar sensor 100 can be integrated as a same system-on-a-chip (SoC). In various embodiments, the radar sensor 100 can be employed on a vehicle, such as a land vehicle, an aircraft, to identify positions and velocities of objects in the operational environment of the vehicle.

The radar sensor 100 further comprises one or more DACs 108. The hardware logic component 106 comprises a signal generator component 110 that prepares radar signals for transmission by way of the transmit antenna 102. The signal generator component 110 is configured to control the DAC 108 to cause the DAC 108 to generate an analog radar signal for transmission by the transmit antenna 102. In other words, the signal generator component 110 generates digital values that, when received by the DAC 108, cause the DAC

108 to output an analog radar signal having various desired signal characteristics. Hence, the radar sensor 100 is configured as a digitally modulated radar sensor, wherein characteristics of radar signals output by the transmit antenna 102 are digitally controlled by the signal generator component 110 of the hardware logic component 106. For example, the signal generator component 110 can be configured to control the DAC 108 such that the radar sensor operates as a phase modulated continuous wave (PMCW) radar sensor.

The radar sensor 100 further includes an analog signal processing component 112. The signal processing component 112 is generally configured to perform various analog signal processing operations on analog signals that are to be output by the transmit antenna 102 and/or that are received by the receive antenna 104. By way of example, and not limitation, the signal processing component 112 can amplify a radar signal output by the DAC 108 to increase the power of the radar signal prior to transmission by way of the transmit antenna 102. In a further example, the signal processing component 112 can be configured to mix a radar signal output by the DAC 108 with a carrier signal to shift a center frequency of the radar signal. The signal processing component 112 can include any of various components that are configured to perform these various functions. For example, the signal processing component 112 can include mixers, amplifiers, filters, or the like. Functionality of the signal processing component 112 and its constituent components can be controlled by the hardware logic component 106. The transmit antenna 102 receives processed radar signals from the signal processing component 112 and emits the radar signals into an operational environment of the radar sensor 100.

The receive antenna 104 receives radar returns from the operational environment. In exemplary embodiments, the radar returns received by the receive antenna 104 comprise reflections, from objects in the operational environment of the sensor 100, of radar signals emitted by the transmit antenna 102. It is to be understood that the radar returns received by the receive antenna 104 can further include reflections of radar signals emitted by other radar emitters that are active within the operational environment of the radar sensor 100. As will be described in greater detail below, the technologies described herein can reduce transmitter leakage and receiver saturation by hopping between frequency subbands used for transmission and receiving. Responsive to receipt of radar returns from the operational environment of the sensor 100, the receive antenna 104 outputs an electrical signal that is indicative of the received radar returns. This electrical signal is referred to herein as a radar signal and is transmitted along one or more transmission lines in the radar sensor 100, as distinct from radar returns that are received by the receive antenna 104 as radiated signals propagating through air or free space in the operational environment of the radar sensor 100.

The signal processing component 112 receives a radar signal from the receive antenna 104. The signal processing component 112 is configured to perform various analog signal processing operations over radar signals received from the receive antenna 104. By way of example, and not limitation, the signal processing component 112 can perform various mixing, filtering, and amplification operations on radar signals output by the receive antenna 104. The signal processing component 112 can be configured to perform various of these signal processing operations (e.g., mixing) based further upon a radar signal transmitted by the transmit antenna 102.

The radar sensor 100 further comprises one or more ADCs 114 that receives a processed radar signal from the signal processing component 112. The ADC 114 digitally samples the radar signal and outputs digital values that are indicative of amplitude of the radar signal over time. These digital values are collectively referred to herein as radar data. The radar data output by the ADC 114 are indicative of the radar returns received by the receive antenna 104.

The hardware logic component 106 receives the radar data from the ADC 114. The hardware logic component 106 further comprises a radar analysis component 116. The radar analysis component 116 is configured to compute positions and/or velocities of targets in the operational environment of the radar sensor 100 based upon the radar data. In a non-limiting example, the radar analysis component 116 can compute a range, a bearing, and/or a velocity of a target in the operational environment of the sensor 100 based upon the radar data.

Figure 2:
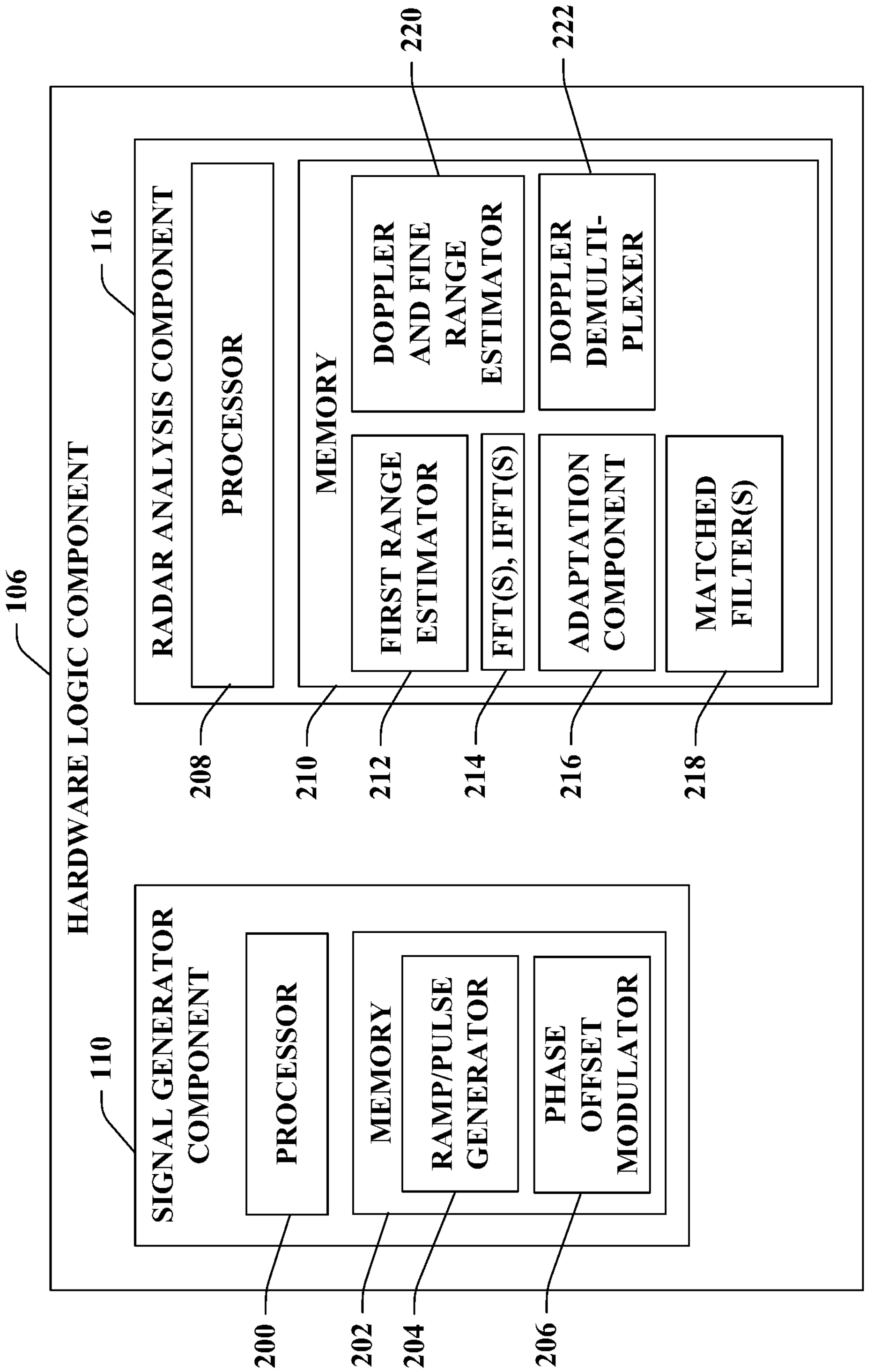
FIG. 2 shows the hardware logic component, in accordance with various aspects described herein.

With reference now to FIG. 2, a more detailed view of the hardware logic component 106 is illustrated, in accordance with various aspects described herein. The hardware logic component 106 comprises the signal generator component 110 and the radar analysis component 116, as discussed with regard to FIG. 1. The signal generator component 110 comprises a processor 200 and a memory 202 configured to provide certain functionality as described herein. For example, the memory 202 can store computer-executable instructions that, when executed by the processor 200, cause the signal generator component 110 to perform certain acts. The memory 202 comprises a ramp/pulse generator component 204 and a phase offset modulator 206. The ramp/pulse generator component 204 generates ramps/pulses (depending on the type of radar system) for transmission. In one embodiment, the ramp/pulse generator component 204 performs time division multiplexing and/or frequency division multiplexing on the signals to be transmitted.

The phase offset modulator 206 assigns to respective transmitters a transmitter-specific phase offset modulation that increments with the chirp number k (e.g., where "chirp" refers to a signal or component thereof that increases in frequency over time, as will be understood by one of skill in the art). While the example herein is described with regard to an increasing chirp (up chirp), it will be understood that in other embodiments a decreasing chirp (down chirp) can be employed.

In one example, a frequency modulated continuous wave (FMCW) signal with Nt transmit antennas (where n=0, . . . , Nt−1) and $N_r$ receiver channels (where m=0, . . . , Nr−1) is considered. The transmitters simultaneously send k ramps/pulses (where k=0 . . . , K−1) with a transmitter-specific phase-offset modulation (see, e.g., FIG. 8), which increments with the chirp number k. For a given transmitter, this results in a linear phase increment from chirp to chirp, with a slope unique to the given transmitter. The phase increment is selected such that the signals from individual transmitters are distributed as peaks (see, e.g., FIG. 9), discreetly over the velocity-dimension (e.g., Doppler-Division Multiplex) with velocity offsets, in accordance with the phase increments. The term "velo label" is used to refer to velocity labelling of a given transmitter. Thus, respective transmitters are assigned to a specific velo label. Moreover, the term "seed velo gate" is used to refer to the respective N peaks in the velo spectrum caused by a single target. The full bandwidth of the signal Bw with period T divided in sub-ramps (e.g., subbands) with a Bwk band with a period of Tk. The transmitted signal X of the transmitter n with frequency rate can be expressed as:

$$xn(k,t)=\exp\left(j*2*pi*\left((f0+\text{delta\_f}(k))*t+1/2*\ \ *t^{\wedge}2\right)\right)*Vc\,(k,n);$$

$$\text{with } Vc\,(k,n)=\exp\left(j*2*pi*k*velolabel(n)/K\right),$$

$$k=0,\ \ldots\ ,K-1 \text{ and } 0<=t<Tk.$$

Where:

xn is the transmit signal X of the transmitted antenna n;

T is the period of a pulse or ramp;

k is the sub-ramp index and denotes slow time;

K is the number of pulses (sub-ramp) in a CPI;

represents the slope of the ramp;

f0 is the start frequency of the ramp;

delta_f(k) is frequency shift of the ramp m;

Vc (k,n) is the doppler phase modulation of the transmitted n in the ramp/pulse k; and velolabel (n) is the velocity label of transmitted n.

The reflected signal is received and processed by the radar analysis component 116. The signal related to the transmitter n and received in the receiver m after being multiplied by the transmitted signal via a mixer is:

$$yn,\,m(k,t)=\exp(1j*2*pi*((f0+\text{delta\_f}(k))*(-td)-\ *(t*td)))*Vc\,(k,n);$$

$$\text{with } td=2*(R0+kV0*t)/c.$$

Where:

td is the time delay to the reception of the reflected signal;

R0 is the target range;

V0 is target velocity; and c is the speed of light.

The radar analysis component 116 comprises a processor 208 and a memory 210 configured to provide certain functionality as described herein. For example, the memory 210 can store computer executable instructions that, when executed by the processor 208, cause the radar analysis component 116 to perform certain acts. The memory 210 comprises a first range estimator 212, one or more fast Fourier transforms (FFT) (and inverse fast Fourier transforms (IFFT)) 214 that can be applied to a received signal during processing and decoding. For example, the first range estimator 212 can apply a 1D FFT when performing an initial range estimation for respective sub-ramps in the received signal. This first range estimate gives a lower range resolution compared to a range estimate using the entire ramp. For instance, if the total available bandwidth is divided by 10 for, e.g., a 10-transmitter radar system, then the first range estimate will have a range resolution of 10%. This range resolution is resolved when the reflected radar return is reconstructed/integrated over the entire bandwidth by the processor 208.

Figure 3:
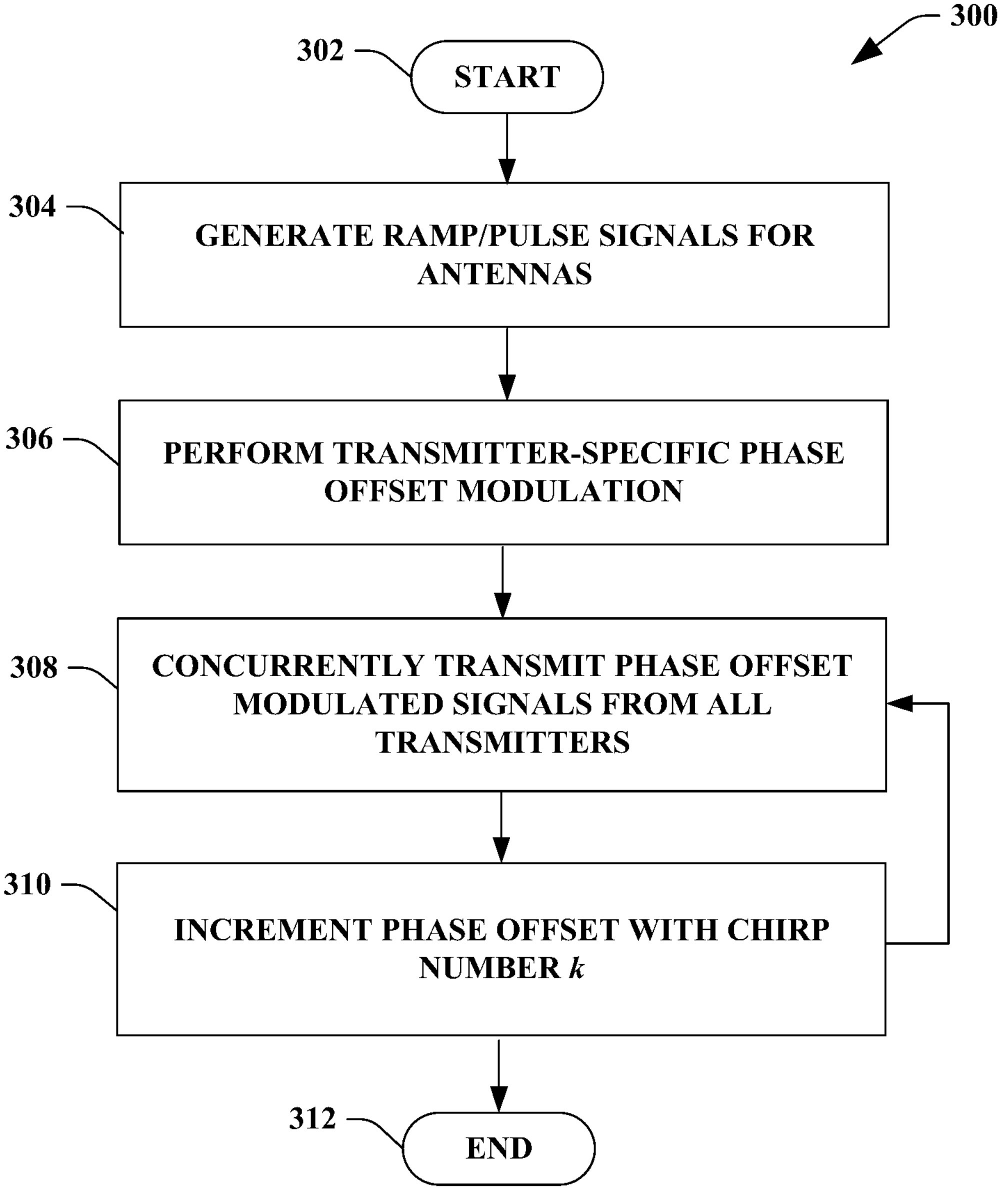
FIG. 3 shows a methodology for generating a signal with $N_t$ transmit antennas and $N_r$ receiver channels, in accordance with various aspects described herein.
Figure 4:
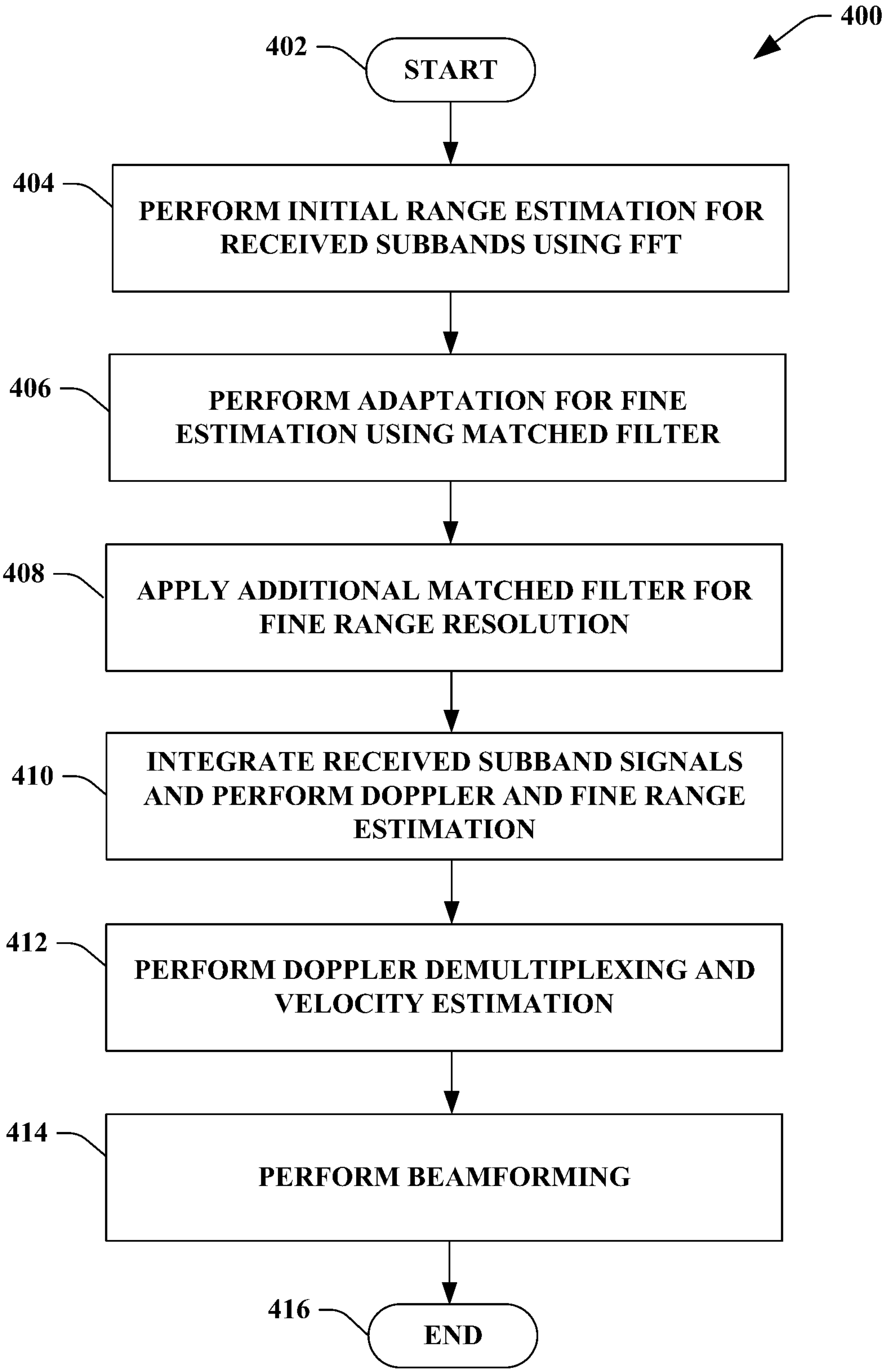
FIG. 4 shows a methodology for performing range and velocity estimation for a reflected signal in a high-resolution radar system while mitigating interference, in accordance with various features described herein.

An adaptation component 216 is also provided and configured to perform an adaptation for fine range estimation. For example, range migration can be determined using the range estimated by the entire ramp, as is done in FMCW radars. This can be performed using matched filters 218 for all possible fine ranges. A given coarse range cell may have a lower resolution relative to the number of times the ramp signal has been divided. For instance, if a ramp has been divided into four sub-ramps each representing ¼ of the bandwidth of the ramp, then a given coarse range will have a resolution approximately equivalent to ¼ of the resolution achieved using the entire ramp. A Doppler and fine range estimation component 220 performs Doppler estimation and fine range calculation by applying a 1D IFFT. The memory 210 further comprises a Doppler demultiplexer 222 that demultiplexes the processed signal to correctly estimate the velocity and position of the target. FIGS. 3 and 4 further detail the functionality provided by the hardware logic component 106.

FIGS. 3 and 4 illustrate exemplary methodologies relating to transmitting, receiving, and processing radar signals for velocity estimation with reduced interference. While the methodologies are shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Turning now solely to FIG. 3, a methodology 300 is illustrated for generating a signal (e.g., FMCW or the like) with Nt transmit antennas and Nr receiver channels, in accordance with various aspects described herein. At 302, the method begins. At 304, signals are generated for transmission from respective ones of a plurality of transmit antennas. At 306, transmitter-specific phase offset modulation is performed on the generated signals. At 308, respective transmitters simultaneously send k ramps/pulses with the transmitter-specific phase-offset modulation (see, e.g., FIG. 8). At 310, the transmitter-specific phase-offset increments with the chirp number k, and the method reverts to 308 for continued transmission. For a given transmitter, this results in a linear phase increment from chirp to chirp, with a slope unique to a given transmitter. The phase increment is selected such that the signals from individual transmitters are distributed as peaks (see, e.g., FIG. 9), discreetly over the velocity-dimension (Doppler-Division Multiplex) with velocity offsets, in accordance with the phase increments. At 312, the method terminates.

Turning now to FIG. 4, a methodology 400 is illustrated for performing range and velocity estimation for a reflected signal in a high-resolution radar system while mitigating interference, in accordance with various features described herein. At 402, the method begins. At 404, range to target is estimated with an FFT applied in respective subbands. This range estimate gives a range resolution related to the bandwidth of a given subband only:

$$yn,\,m(k,p,l)=fft(\exp(1j*2*pi*((f0+\text{delta\_}(k))*(-td)-\ *(t(td)))));$$

Where p1 is the range bin with a range resolution relative to the band of the given subband (small ramp).

After the first range estimation, a matched filter with the range estimate in the first step is applied in the signal, at 406, such that:

$$C(:\,,p1)=\exp\left(j*2*pi*2*\text{r\_coarse}*\text{delta\_f}(k)/c\right);$$

-continued

% Coarse range cell migration $$C(:,p1).*y(k,p1)$$

At 408, an additional matched filter is applied for the fine range resolution, such that:

$$B=\exp(j*2*pi*2*\text{delta\_f}(k)*\text{r\_fine}/c);$$

% Full resolution range estimation (matched filter)

$$B.*C(:,p1).*y(k,p1)$$

Following the processing, at 410, the FFT-to-doppler estimation is performed in respective new fine range cells, such that:

$$Yn,m(p1,:,:)=FFT(B.*C(:,p1).*yn,m(:,p1)));$$

At 412, demultiplexing is performed to correctly estimate the velocity and position of the target. For transmitter demultiplexing, a virtual array of an individual transmitter in a given range-velo gate is extracted from the data set, by taking into account the assigned velocity label for a given transmitter. The velocity labels are stored in a vector: velolabel=(vl0, vl1, . . . , vlNt−1), sorted from n=0 to Nt−1, where n is assigned to individual transmitters. For extraction of a single range gate sample of the Mth receiver in the 1-m receivers, the velo gate is defined as:

$$VelolabelTarget(1)=\text{mod}\,(VG(1)+velolabel,L);$$

using complex data from the receiver.

At 414, beamforming to the target is performed, and the velocity angle and range are estimated. The method terminates at 416.

Figure 5A:
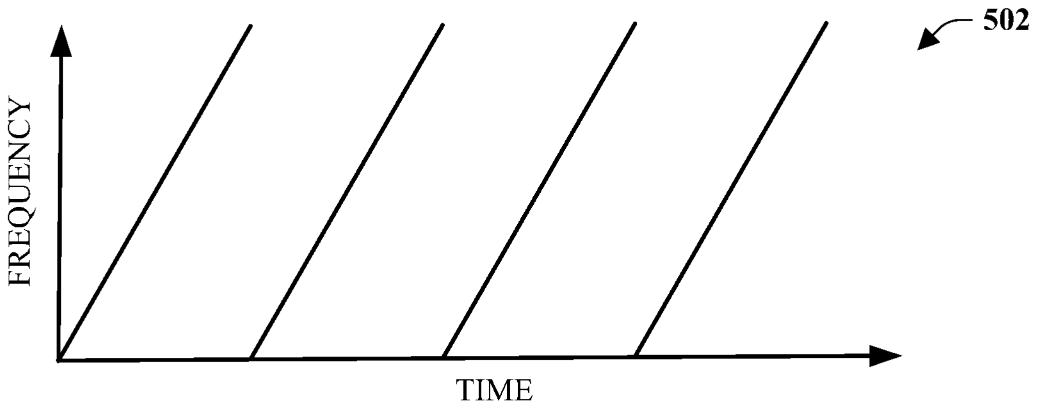
FIG. 5A shows a transmission scheme comprising a plurality of ramps repetitively transmitted by a single radar over time.
Figure 5B:
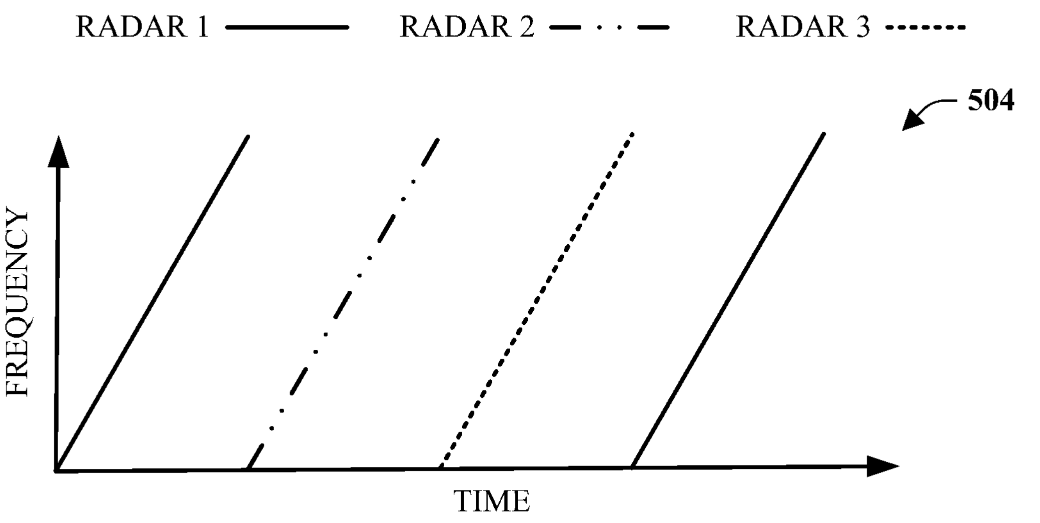
FIG. 5B shows a time division multiplexed transmission scheme wherein three radar systems are permitted to transmit their ramp signals in different non-overlapping time slots in order to mitigate interference.
Figure 5C:
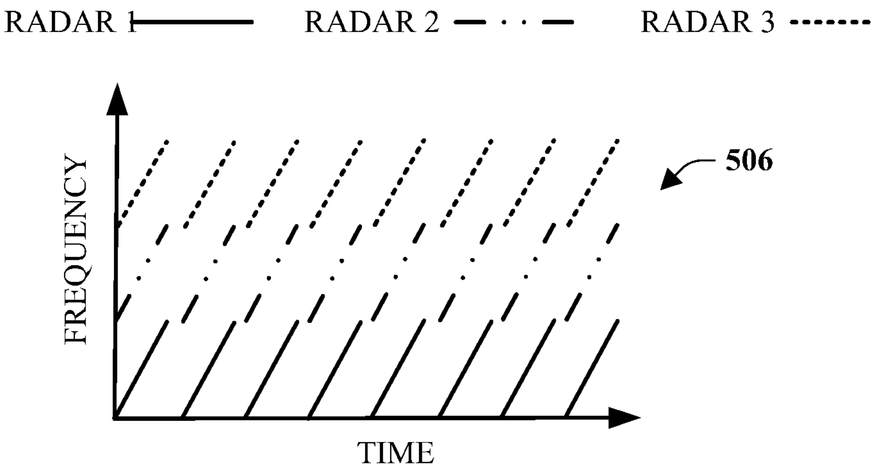
FIG. 5C illustrates a frequency division multiplexed transmission scheme.
Figure 5D:
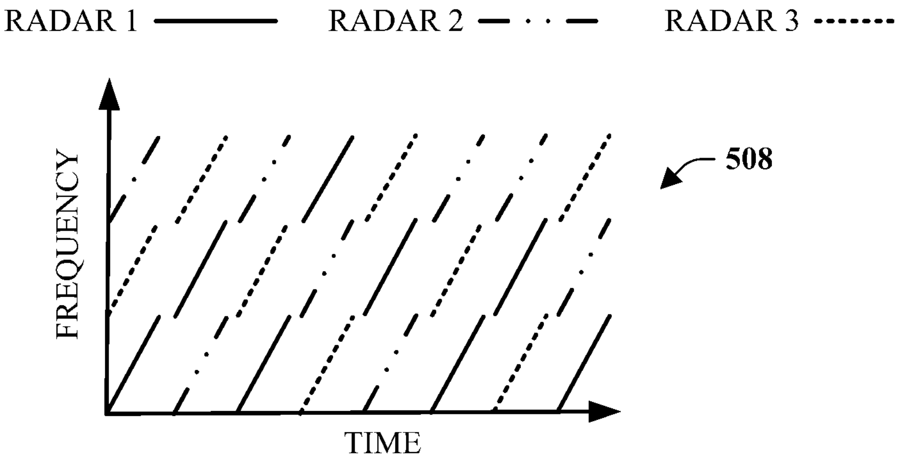
FIG. 5D shows a transmission scheme that employs both time division multiplexing and frequency division multiplexing to the transmission signals of three different radar systems.

FIGS. 5A-5D illustrate various examples of radar signal schemes that may be used for transmission in conjunction with the systems and methods described herein, in accordance with various aspects. In FIG. 5A, a FMCW radar transmission scheme 502 is shown. The signal comprises a plurality of ramps repetitively transmitted by a single radar over time. FIG. 5B shows a time division multiplexed transmission scheme 504 wherein three radar systems are permitted to transmit their ramp signals in different non-overlapping time slots in order to mitigate interference. FIG. 5C illustrates a frequency division multiplexed transmission scheme 506 wherein three radar systems are respectively allocated a subband of the overall available bandwidth, and the three radar systems are permitted to transmit in the same time slot but using different frequency subbands. FIG. 5D shows a transmission scheme 508 that employs both time division multiplexing and frequency division multiplexing to the transmission signals of three different radar systems. As can be seen, in a given time slot, all three radar systems are permitted to transmit using different subbands of the overall available bandwidth. However, in contrast to the transmission scheme 506 of FIG. 5C, a given radar system is not constrained to use the same frequency subband in a given time slot.

Figure 6A:
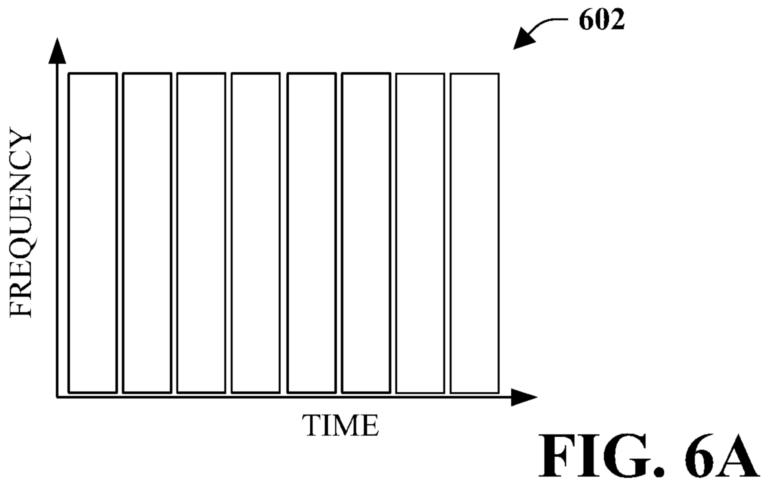
FIG. 6A shows a radar transmission scheme having a plurality of pulses repetitively transmitted by a single radar over time.
Figure 6B:
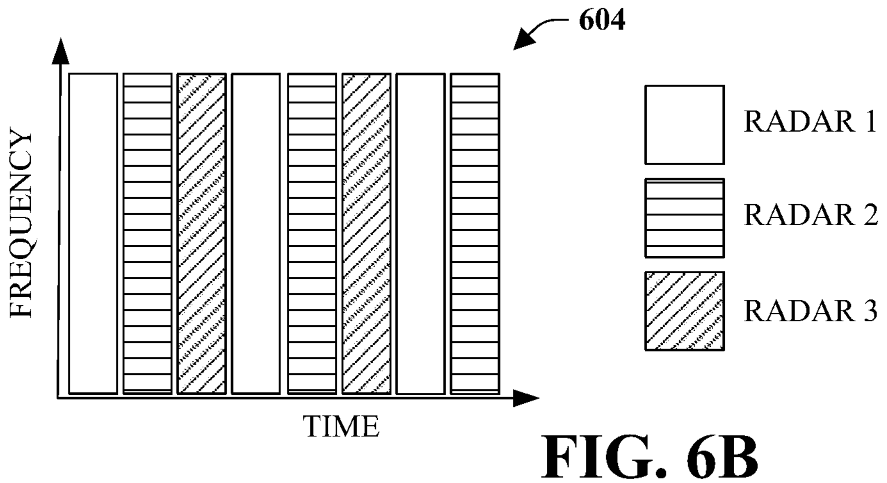
FIG. 6B shows a time division multiplexed transmission scheme wherein three radar systems are permitted to transmit their pulse signals in different non-overlapping time slots in order to mitigate interference.
Figure 6C:
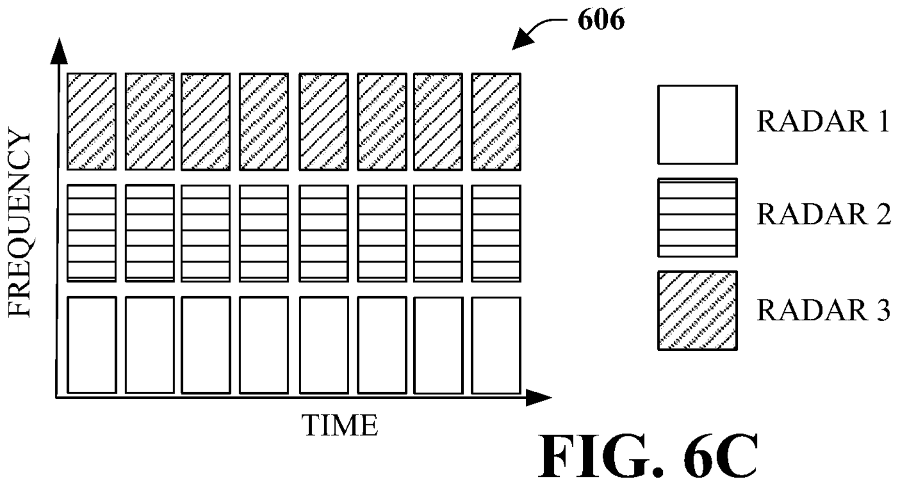
FIG. 6C illustrates a frequency division multiplexed transmission scheme wherein three radar systems are respectively allocated a subband of the overall available bandwidth.
Figure 6D:
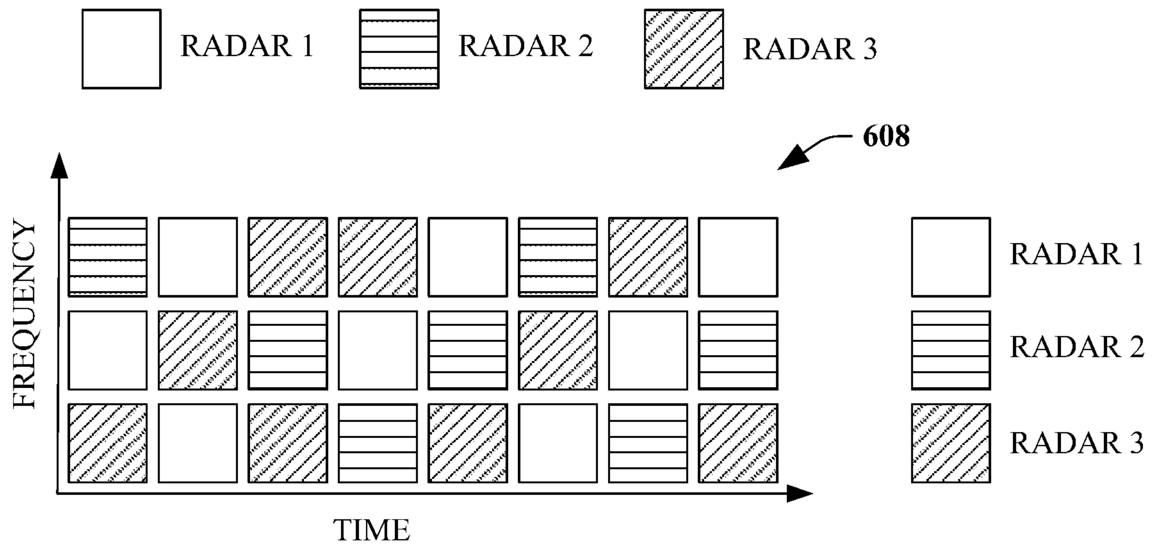
FIG. 6D shows a transmission scheme that employs both time division multiplexing and frequency division multiplexing to the transmission signals of three different radar systems.

FIGS. 6A-6D illustrate various examples of wideband digital modulator pulse radar signals, in accordance with various aspects described herein. In FIG. 6A, a simple radar PMCW, orthogonal frequency division multiplexing (OFDM), etc.) transmission scheme 602 is shown. The signal comprises a plurality of pulses repetitively transmitted by a single radar over time. FIG. 6B shows a time division multiplexed transmission scheme 604 wherein three radar systems are permitted to transmit their pulse signals in different non-overlapping time slots in order to mitigate interference. FIG. 6C illustrates a frequency division multiplexed transmission scheme 606 wherein three radar systems are respectively allocated a subband of the overall available bandwidth, and the three radar systems are permitted to transmit in the same time slot but using different frequency subbands. FIG. 6D shows a transmission scheme 608 that employs both time division multiplexing and frequency division multiplexing to the transmission signals of three different radar systems. As can be seen, in a given time slot all three radar systems are permitted to transmit using different subbands of the overall available bandwidth. However, in contrast to the transmission scheme 606 of FIG. 6C, respective radar systems are not constrained to use the same frequency subband in a respective time slots.

Figure 7:
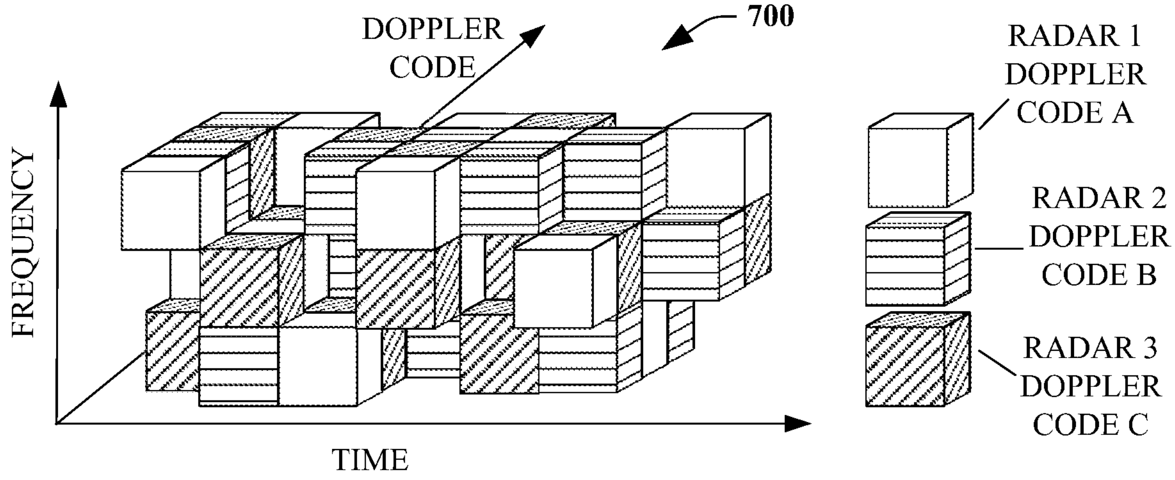
FIG. 7 shows a transmission scheme wherein Doppler code is applied in addition to frequency division and time division, in accordance with one or more aspects described herein.

FIG. 7 shows a transmission scheme 700 wherein Doppler code is applied in addition to frequency division and time division, in accordance with one or more aspects described herein. By applying the Doppler code, any interference that may arise when the reflected signal is returned to the receiver will not be coherent. This, in turn, facilitates integrating all of the received frequency subband signals over the entirety of the bandwidth used for transmission in order to provide a full resolution image equivalent to that which can be achieved by wideband radar system but without the interference.

Figure 8:
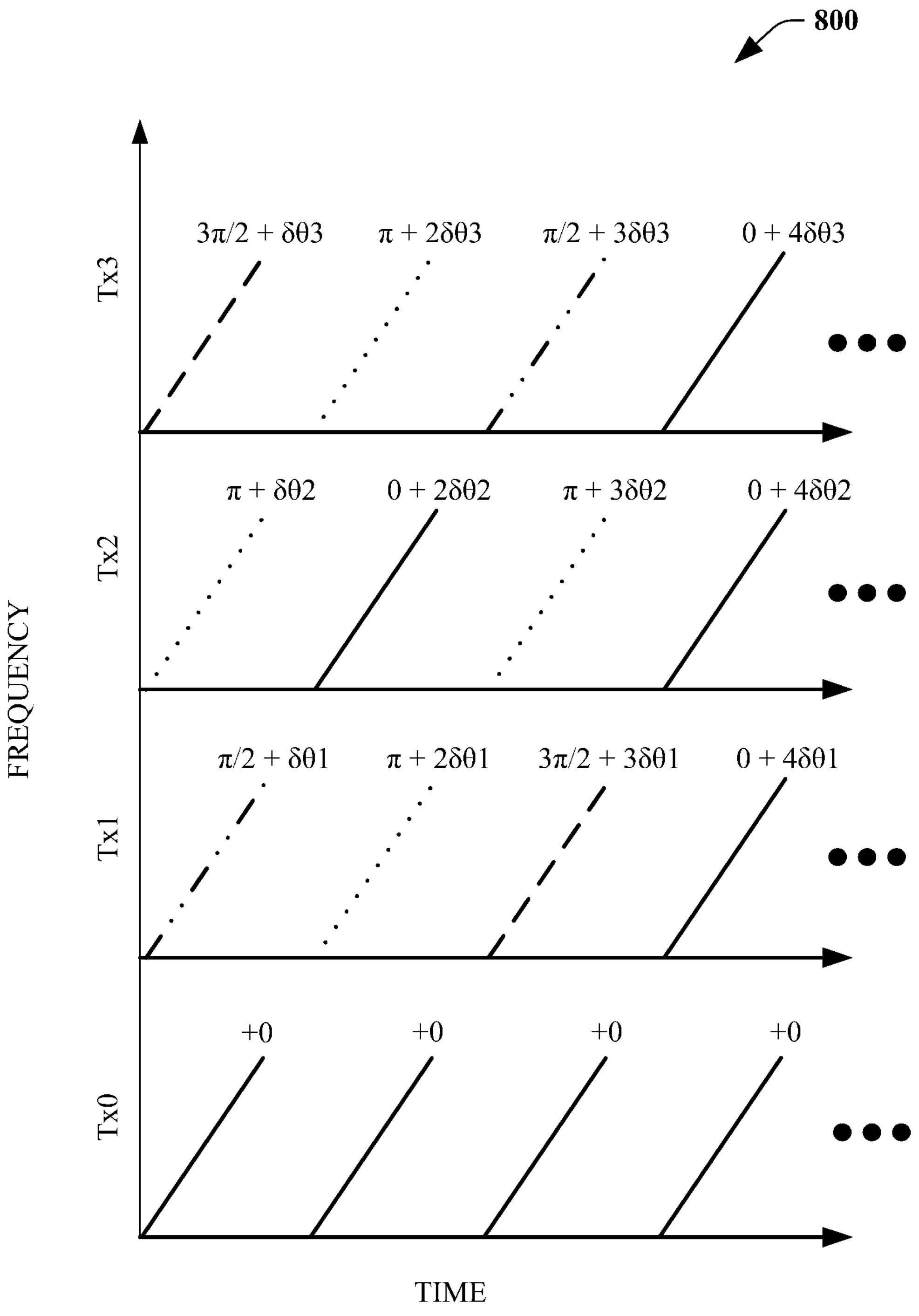
FIG. 8 shows a transmission scheme wherein a plurality of transmitters have been assigned transmitter-specific phase offsets, in accordance with one or more features described herein.

FIG. 8 shows a transmission scheme 800 wherein a plurality of transmitters have been assigned transmitter-specific phase offsets, in accordance with one or more features described herein. This feature is also discussed above with regard to FIG. 2. As can be seen, the plurality of transmitters TX0, TX1, TX2, TX3 all have different phase shifts applied to their respective subband frequencies. This feature adds a Doppler component to the transmitting signal so that when the radar return is received the respective phase shifted subbands can be reintegrated over the entirety of the bandwidth used for transmission to provide both a fine resolution image of the target as well as a highly accurate velocity estimation.

Figure 9:
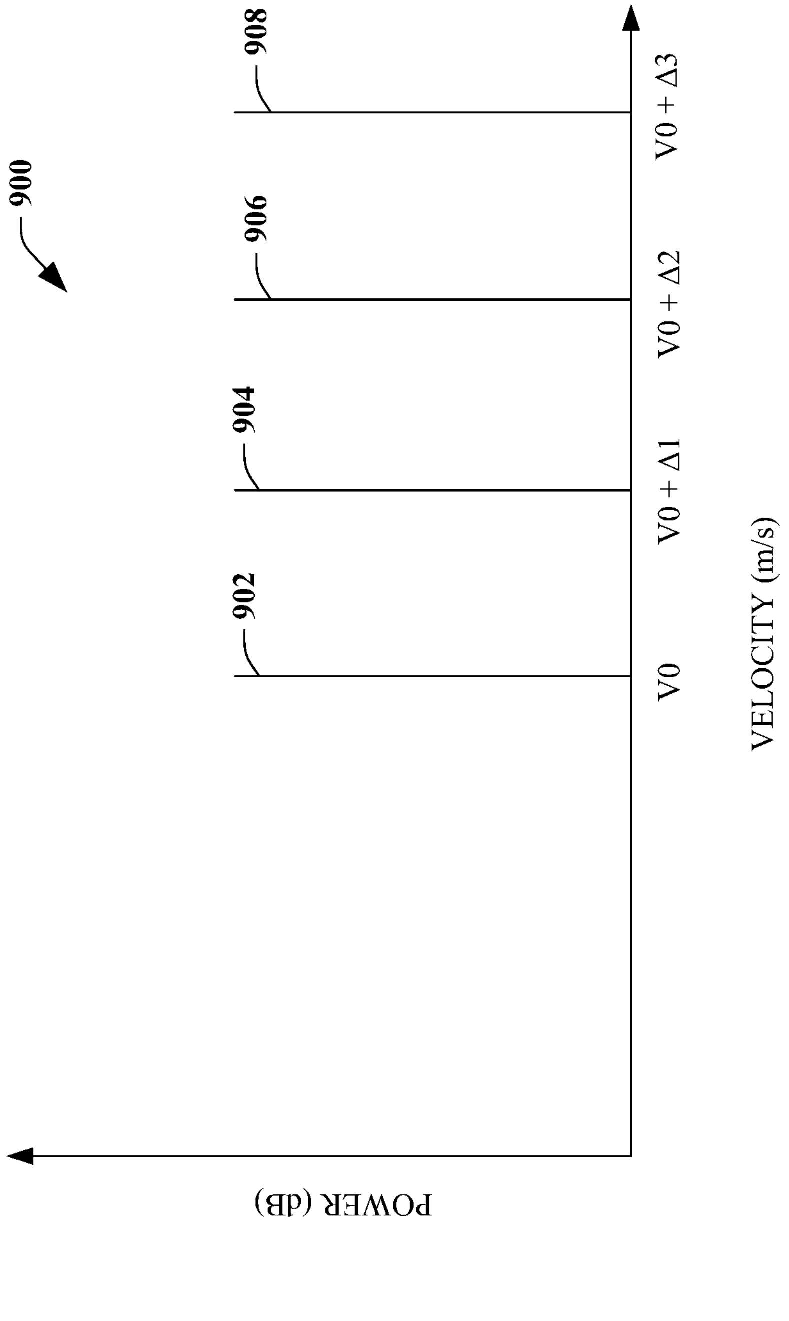
FIG. 9 illustrates a graph having a plurality of peaks with similar magnitudes and distributed over several velocities.

FIG. 9 illustrates a graph 900 having a plurality of peaks with similar magnitudes and distributed over several velocities. A first peak 902 represents a reflected signal it was originally transmitted by transmitter TX0 (FIG. 8). Similarly, peaks 904, 906, and 908 represent reflected signals originally transmitted by transmitters TX1, TX2, and TX3, respectively. The values Δ1, Δ2, and Δ3 correspond to velocity shifts that are perceived due to the transmitter-specific phase shifts applied to transmitters TX1, TX2, TX3.

According to an example, if the peak 902 occurs at 5 m/s, then the peaks 904, 906, 908 will occur respectively at 7 m/s, 9 m/s, and 11 m/s. When all four peaks (assuming a 4-transmitter system) are detected, the system knows that the radar return represents a valid target and that the first peak 902 is accurate. If fewer than all four peaks are returned, then the signal can be assumed to be due to interference and discarded. Based on this information, the systems and methods described herein generate output indicative of the presence or absence in the radar returns of peaks corresponding to the phase shift assigned to a given transmit antenna, wherein the peaks are indicative of whether a target is present in the environment of the radar system. It will be appreciated that the system can comprise any number N of transmit antennas and is not limited to the 4 illustrated, and the receivers can then receive signals for generating N peaks to validate the radar return.

Figure 10:
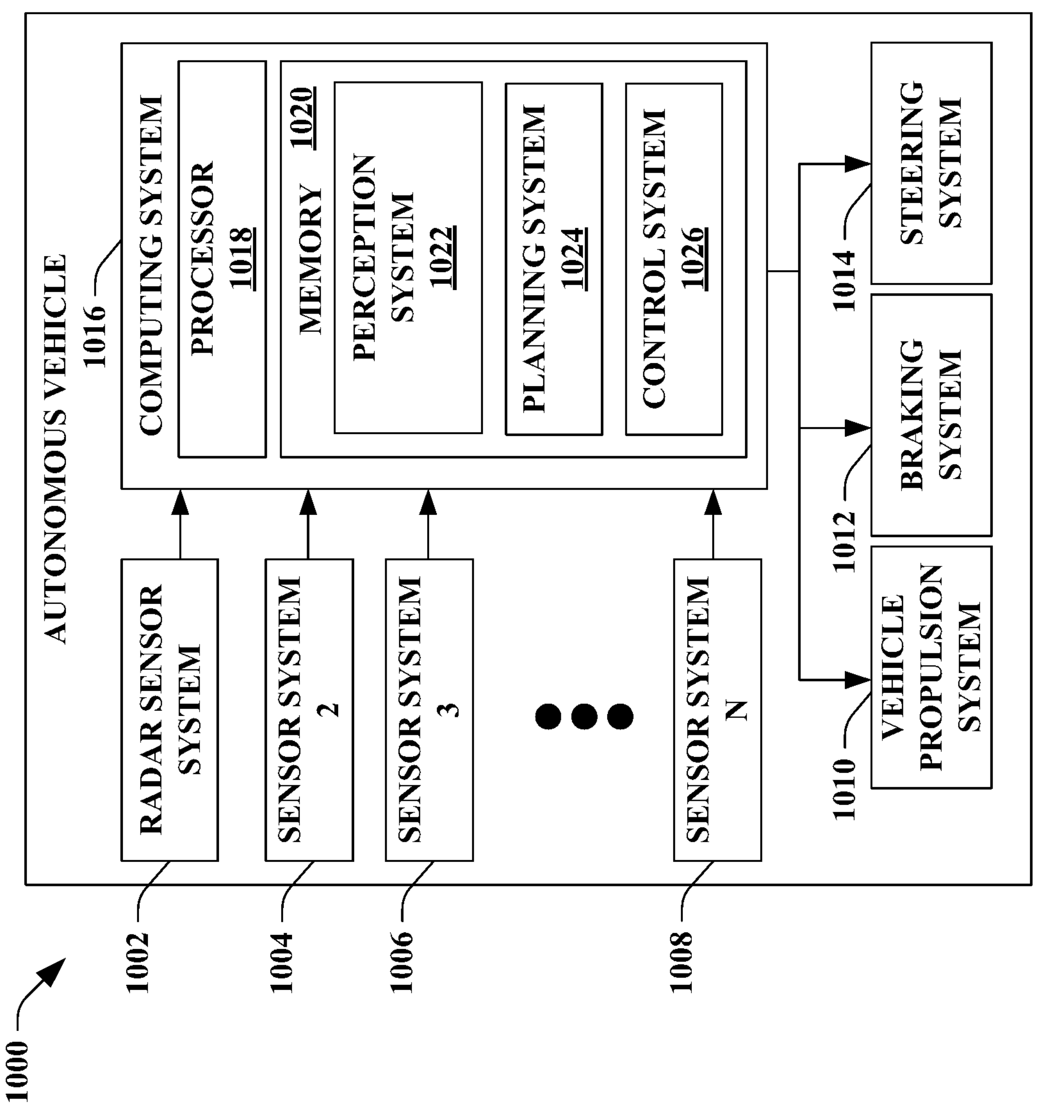
FIG. 10 is a functional block diagram of an exemplary AV.

Various technologies described herein are suitable for use in connection with an autonomous vehicle (AV) that employs a radar system to facilitate navigation about roadways. Referring now to FIG. 10, an exemplary AV 1000 is illustrated, wherein the AV 1000 can navigate about roadways without human conduction based upon sensor signals output by sensor systems of the AV 1000. The AV 1000 includes a plurality of sensor systems 1002-1008 (a first sensor system 1002 through an Nth sensor system 1008). The sensor systems 1002-1008 may be of different types. For example, the first sensor system 1002 is a radar sensor system, the second sensor system 1004 may be a lidar sensor system, the third sensor system 1006 may be a camera (image) system, and the Nth sensor system 1008 may be a sonar system. Other exemplary sensor systems include GPS sensor systems, inertial sensor systems, infrared sensor systems, and the like. The various sensor systems 1002-1008 are arranged about the AV 1000. The sensor systems 1002-1008 are configured to repeatedly (e.g., continuously, or periodically) output sensor data that is representative of objects and conditions in the driving environment of the AV 1000.

The AV 1000 further includes several mechanical systems that are used to effectuate appropriate motion of the AV 1000. For instance, the mechanical systems can include but are not limited to, a vehicle propulsion system 1010, a braking system 1012, and a steering system 1014. The vehicle propulsion system 1010 may be an electric engine, an internal combustion engine, or a combination thereof. The braking system 1012 can include an engine brake, brake pads, actuators, a regenerative braking system, and/or any other suitable componentry that is configured to assist in decelerating the AV 1000. The steering system 1014 includes suitable componentry that is configured to control the direction of movement of the AV 1000.

The AV 1000 additionally comprises a computing system 1016 that is in communication with the sensor systems 1002-1008 and is further in communication with the vehicle propulsion system 1010, the braking system 1012, and the steering system 1014. The computing system 1016 includes a processor 1018 and memory 1020 that includes computer-executable instructions that are executed by the processor 1018. In an example, the processor 1018 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 1020 comprises a perception system 1022, a planning system 1024, and a control system 1026. Briefly, the perception system 1022 is configured to identify the presence of objects and/or characteristics of objects in the driving environment of the AV 1000 based upon sensor data output by the sensor systems 1002-1008. The planning system 1024 is configured to plan a route and/or a maneuver of the AV 1000 based upon data pertaining to objects in the driving environment that are output by the perception system 1022. The control system 1026 is configured to control the mechanical systems 1010-1014 of the AV 1000 to effectuate appropriate motion to cause the AV 1000 to execute a maneuver planned by the planning system 1024.

The perception system 1022 is configured to identify objects in proximity to the AV 1000 that are captured in sensor signals output by the sensor systems 1002-1008. By way of example, the perception system 1022 can be configured to identify the presence of an object in the driving environment of the AV 1000 based upon images generated by a camera system included in the sensor systems 1004-1008. In another example, the perception system 1022 can be configured to determine a presence and position of an object based upon radar data output by the radar sensor system 1002. In exemplary embodiments, the radar sensor system 1002 can be or include the radar sensor 100. In such embodiments, the perception system 1022 can be configured to identify a position of an object in the driving environment of the AV 1000 based upon the estimated range output by the radar sensor 100.

The AV 1000 can be included in a fleet of AVs that are in communication with a common server computing system. In these embodiments, the server computing system can control the fleet of AVs such that radar sensor systems of AVs operating in a same driving environment (e.g., within line of sight of one another, or within a threshold distance of one another) employ different pulse sequence carrier frequencies. In an exemplary embodiment, a radar sensor system of a first AV can be controlled so as not to transmit pulse sequences having same center frequencies as pulse sequences transmitted by a radar sensor system of a second AV at the same time. In further embodiments, the radar sensor system of the first AV can be controlled to transmit pulse sequences in a different order than a radar sensor system of a second AV. For instance, the radar sensor system of the first AV can be configured to transmit a set of pulse sequences at four different center frequencies A, B, C, and D in an order A, B, C. D. The radar sensor system of the second AV can be configured to transmit pulse sequences using a same set of center frequencies in a frequency order B, A, D. C. Such configurations can mitigate the effects of interference when multiple AVs that employ radar sensor systems are operating in a same driving environment.

Figure 11:
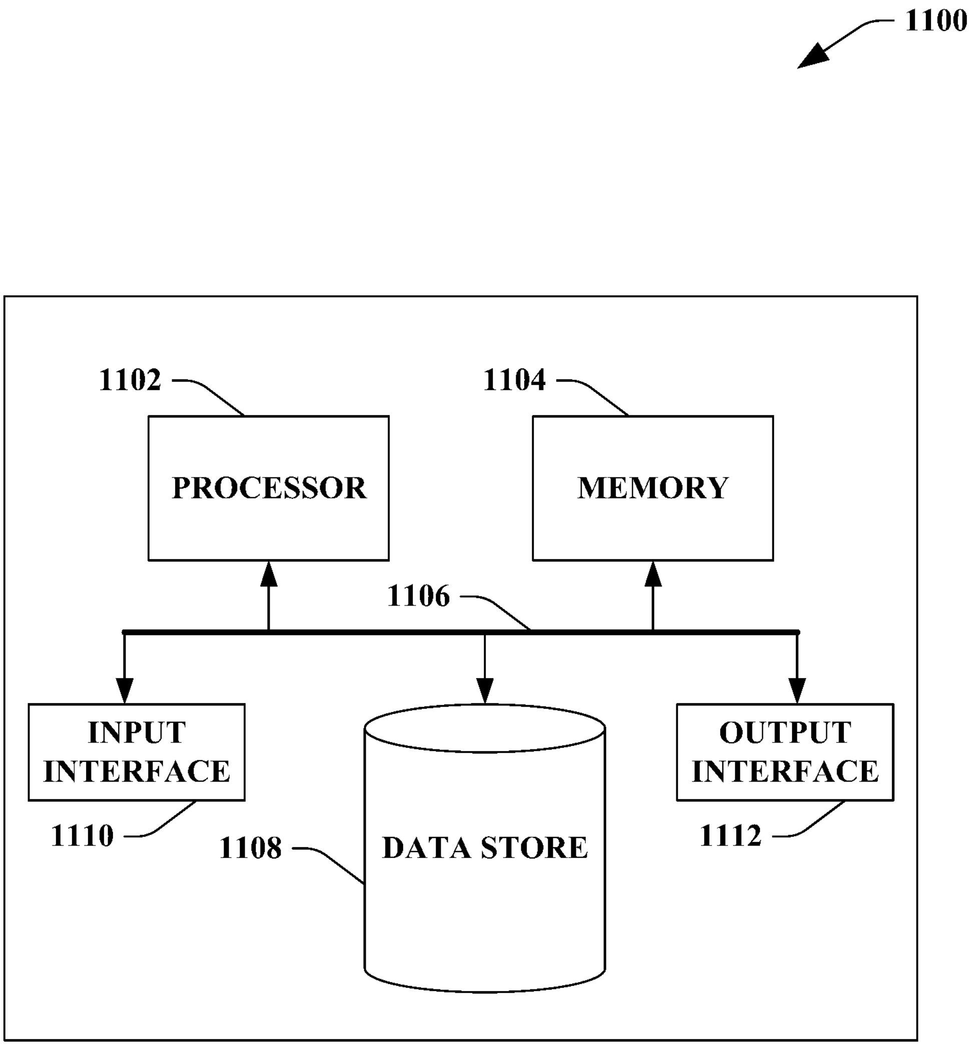
FIG. 11 is an exemplary computing system.

Referring now to FIG. 11, a high-level illustration of an exemplary computing device 1100 that can be used in accordance with the systems and methodologies disclosed herein is illustrated. For instance, the computing device 1100 may be or include the computing system 1016. The computing device 1100 includes at least one processor 1102 that executes instructions that are stored in a memory 1104. The instructions may be, for instance, instructions for implementing functionality described as being carried out by one or more modules, components, or systems discussed above or instructions for implementing one or more of the methods described above. The processor 1102 may be a GPU, a plurality of GPUs, a CPU, a plurality of CPUs, a multi-core processor, a combination of the foregoing, etc. The processor 1102 may access the memory 1104 by way of a system bus 1106. In addition to storing executable instructions, the memory 1104 may also store radar data, beamformed radar data, neural network configurations, etc.

The computing device 1100 additionally includes a data store 1108 that is accessible by the processor 1102 by way of the system bus 1106. The data store 1108 may include executable instructions, radar data, beamformed radar data, embeddings of these data in latent spaces, etc. The computing device 1100 also includes an input interface 1110 that allows external devices to communicate with the computing device 1100. For instance, the input interface 1110 may be used to receive instructions from an external computing device, etc. The computing device 1100 also includes an output interface 1112 that interfaces the computing device 1100 with one or more external devices. For example, the computing device 1100 may transmit control signals to the vehicle propulsion system 1010, the braking system 1012, and/or the steering system 1014 by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), SOCs, Complex Programmable Logic Devices (CPLDs), etc.

Systems and methods have been described herein in accordance with at least the examples set forth below.

(A1) In one aspect, method performed by a radar system is described herein. The method includes transmitting a radar signal from a plurality of transmit antennas, wherein the transmit antennas are assigned transmitter-specific phase offsets by way of which the radar signal is modulated, and wherein the transmitter-specific phase offsets correspond to offsets in velocity of a target. The method also includes receiving at a plurality of receive antennas a radar return comprising transmitted signals reflected by the target. Further, the method includes determining whether a peak signal corresponding to the phase offset assigned to a given transmit antenna is present in the received radar returns, the peak signal corresponding to a perceived velocity at which the target is moving. The method also includes generating an output indicative of the presence or absence of peaks corresponding to the phase offsets assigned to respective transmit antennas, wherein the peaks are indicative of a presence of the target in an environment of the radar system.

(A2) In some embodiments of the method (A1), the radar signal transmitted by a first transmitter antenna of the plurality of transmitter antennas has a phase offset of zero, and the remainder of the transmit antennas are assigned respective non-zero phase offsets.

(A3) In some embodiments of the method (A2), the method further includes identifying a peak of a reflected signal from the first transmitter as corresponding to a valid velocity of the target when respective peaks are identified for the plurality of transmit antennas.

(A4) In some embodiments of any one of the methods (A1)-(A3), the method further includes determining that the radar return is not valid when a peak is identified for fewer than all of the plurality of transmit antennas.

(A5) In some embodiments of any one of the methods (A1)-(A4), the radar signal transmitted from the plurality of transmit antennas is at least one of time division multiplexed and frequency division multiplexed.

(A6) In some embodiments of any one of the methods (A1)-(A5), the radar system is configured for phase-modulated continuous wave (PMCW) operation.

(A7) In some embodiments of any one of the methods (A1)-(A6), the radar system is configured for orthogonal frequency division multiplexing (OFDM) operation.

(B1) According to another aspect, a radar system is described herein. The radar system includes a plurality of transmit antennas that transmit a radar signal toward a target, wherein the transmit antennas are assigned a transmitter-specific phase offset via which the radar signal is modulated, and wherein the phase offsets correspond respectively to offsets in velocity of a target. The radar system also includes a plurality of receive antennas that receive a radar return comprising transmitted signals reflected by the target. Further, the radar system includes one or more processors configured to determine whether a peak signal corresponding to the phase offset assigned to a given transmit antenna is present in the received radar returns, the peak signal corresponding to a perceived velocity at which the target is moving. The one or more processors are further configured to generate an output indicative of the presence or absence of peaks corresponding to the phase offset assigned to respective transmit antennas. The peaks are indicative of a presence of the target in an environment of the radar system.

(B2) In some embodiments of the radar system of (B1), the radar signal transmitted by a first transmitter antenna of the plurality of transmitter antennas has a phase offset of zero, and wherein the remainder of the transmitter antennas are assigned respective non-zero phase offsets.

(B3) In some embodiments of the radar system of (B2), the one or more processers are further configured to identify a peak of a reflected signal from the first transmitter as corresponding to a valid velocity of the target when respective peaks are identified for the plurality of transmit antennas.

(B4) In some embodiments of any one of the radar systems of (B1)-(B3), the one or more processers are further configured to determine that the radar return is not valid when a peak is identified for fewer than all of the plurality of transmit antennas.

(B5) In some embodiments of any one of the radar systems of (B1)-(B4), wherein the radar signal transmitted from the plurality of transmit antennas is at least one of time division multiplexed or frequency division multiplexed.

(B6) In some embodiments of any one of the radar systems of (B1)-(B5), the radar system is configured for phase-modulated continuous wave (PMCW) operation.

(B7) In some embodiments of any one of the radar systems of (B1)-(B6), wherein the radar system is configured for orthogonal frequency division multiplexing (OFDM) operation.

(C1) In another aspect, a radar system is described herein. The radar system includes a plurality of transmit antennas, a plurality of receive antennas; and a hardware logic component that is configured to perform acts including transmitting a radar signal from the plurality of transmit antennas, wherein the transmit antennas are assigned transmitter-specific phase offsets via which the radar signal is modulated, and wherein the transmitter-specific phase offsets correspond to offsets in velocity of a target. The accts further include receiving at the plurality of receive antennas a radar return comprising transmitted signals reflected by the target. The acts also include determining whether a peak signal corresponding to the phase offset assigned to a given transmit antenna is present in the received radar returns, the peak signals corresponding to perceived velocities at which the target is moving. Moreover, the acts include generating an output indicative of the presence or absence of peaks corresponding to the phase offsets assigned to respective transmit antennas, wherein the peaks are indicative of a presence of the target in an environment of the radar system.

(C2) In some embodiments of the radar system of (C1), the radar signal transmitted by a first transmitter antenna of the plurality of transmitter antennas has a phase offset of zero, and the remainder of the transmitter antennas are assigned respective non-zero phase offsets.

(C3) In some embodiments of the radar system of (C2), the acts further include identifying a peak of a reflected signal from the first transmitter as corresponding to a valid velocity of the target when respective peaks are identified for the plurality of transmit antennas.

(C4) In some embodiments of any one of the radar systems of (C1)-(C3), the acts further include determining that the radar return is not valid when a peak is identified for fewer than all of the plurality of transmit antennas.

(C5) In some embodiments of any one of the radar systems of (C1)-(C4), the radar signal transmitted from the plurality of transmit antennas is at least one of time division multiplexed and frequency division multiplexed.

(C6) In some embodiments of any one of the radar systems of (C1)-(C5), wherein the radar system is configured for at least one of phase-modulated continuous wave (PMCW) operation and orthogonal frequency division multiplexing (OFDM) operation.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a radar system comprising a plurality of transmit antennas, the method comprising:

transmitting a radar signal from a plurality of transmit antennas, wherein the plurality of transmit antennas are assigned transmitter-specific phase offsets by way of which the radar signal is modulated, wherein the transmitter-specific phase offsets correspond to offsets in velocity of a target, and wherein transmitting the radar signal from the plurality of transmit antennas is according to:

a frequency which is uniquely and randomly allocated to the radar system from among a set of candidate frequencies;

a timeslot which is uniquely and randomly allocated to the radar system from among a set of candidate timeslots; and a Doppler code which is uniquely allocated to the radar system from among a set of candidate Doppler codes;

receiving at a plurality of receive antennas a radar return comprising transmitted signals reflected by the target;

determining whether a peak signal corresponding to a phase offset assigned to a given transmit antenna from among the phase offsets is present in the received radar returns, the peak signal corresponding to a perceived velocity at which the target is moving; and generating an output indicative of a presence or absence of peaks corresponding to the phase offsets assigned to respective transmit antennas, wherein the peaks are indicative of a presence of the target in an environment of the radar system.

2. The method of claim 1, wherein the radar signal transmitted by a first transmit antenna of the plurality of transmit antennas has a phase offset of zero, and wherein the remainder of the plurality of transmit antennas are assigned respective non-zero phase offsets.

3. The method of claim 2, further comprising identifying a peak of a reflected signal from the first transmit antenna as corresponding to a valid velocity of the target when respective peaks are identified for the plurality of transmit antennas.

4. The method of claim 1, further comprising determining that the radar return is not valid when a peak is identified for fewer than all of the plurality of transmit antennas.

5. The method of claim 1, wherein the radar signal transmitted from the plurality of transmit antennas is at least one of time division multiplexed and frequency division multiplexed.

6. The method of claim 1, wherein the radar system is configured for at least one of:

phase-modulated continuous wave (PMCW) operation; or orthogonal frequency division multiplexing (OFDM) operation.

7. The method of claim 1, wherein transmitting the radar signal according to the Doppler code comprises adding a Doppler component to the radar signal, wherein the Doppler component corresponds to the Doppler code.

8. A radar system comprising:

a plurality of transmit antennas that transmit a radar signal toward a target, wherein the plurality of transmit antennas are assigned transmitter-specific phase offsets via which the radar signal is modulated, wherein the phase offsets correspond respectively to offsets in velocity of a target, and wherein the plurality of transmit antennas transmit the radar signal according to:

a frequency which is uniquely and randomly allocated to the radar system from among a set of candidate frequencies;

a timeslot which is uniquely and randomly allocated to the radar system from among a set of candidate timeslots; and a Doppler code which is uniquely allocated to the radar system from among a set of candidate Doppler codes;

a plurality of receive antennas that receive a radar return comprising transmitted signals reflected by the target; and one or more processors configured to:

determine whether a peak signal corresponding to a phase offset assigned to a given transmit antenna from among the phase offsets is present in the received radar returns, the peak signal corresponding to a perceived velocity at which the target is moving; and generate an output indicative of a presence or absence of peaks corresponding to the phase offset assigned to respective transmit antennas;

wherein the peaks are indicative of a presence of the target in an environment of the radar system.

9. The radar system of claim 8, wherein the radar signal transmitted by a first transmit antenna of the plurality of transmit antennas has a phase offset of zero, and wherein the remainder of the plurality of transmit antennas are assigned respective non-zero phase offsets.

10. The radar system of claim 9, wherein the one or more processors are further configured to identify a peak of a reflected signal from the first transmit antenna as corresponding to a valid velocity of the target when respective peaks are identified for the plurality of transmit antennas.

11. The radar system of claim 8, wherein the one or more processors are further configured to determine that the radar return is not valid when a peak is identified for fewer than all of the plurality of transmit antennas.

12. The radar system of claim 8, wherein the radar signal transmitted from the plurality of transmit antennas is at least one of time division multiplexed or frequency division multiplexed.

13. The radar system of claim 8, wherein the radar system is configured for phase-modulated continuous wave (PMCW) operation.

14. The radar system of claim 8, wherein the radar system is configured for orthogonal frequency division multiplexing (OFDM) operation.

15. A radar system comprising:

a plurality of transmit antennas;

a plurality of receive antennas; and a hardware logic component that is configured to perform acts comprising:

transmitting a radar signal from the plurality of transmit antennas, wherein the plurality of transmit antennas are assigned transmitter-specific phase offsets via which the radar signal is modulated, wherein the transmitter-specific phase offsets correspond to offsets in velocity of a target, and wherein transmitting the radar signal from the plurality of transmit antennas is according to:

a frequency which is uniquely and randomly allocated to the radar system from among a set of candidate frequencies, wherein the frequency is different from a second frequency which is uniquely and randomly allocated to another radar system different from the radar system;

a timeslot which is uniquely and randomly allocated to the radar system from among a set of candidate timeslots, wherein the timeslot is different from a second timeslot which is uniquely and randomly allocated to the other radar system; and a Doppler code which is uniquely allocated to the radar system from among a set of candidate Doppler codes, wherein the Doppler code is different from a second Doppler code which is uniquely allocated to the other radar system;

receiving at the plurality of receive antennas a radar return comprising transmitted signals reflected by the target;

determining whether a peak signal corresponding to a phase offset assigned to a given transmit antenna from among the phase offsets is present in the received radar returns, the peak signals corresponding to perceived velocities at which the target is moving; and generating an output indicative of a presence or absence of peaks corresponding to the phase offsets assigned to respective transmit antennas, wherein the peaks are indicative of a presence of the target in an environment of the radar system.

16. The radar system of claim 15, wherein the radar signal transmitted by a first transmit antenna of the plurality of transmit antennas has a phase offset of zero, and wherein the remainder of the plurality of transmit antennas are assigned respective non-zero phase offsets.

17. The radar system of claim 16, further comprising identifying a peak of a reflected signal from the first transmit antenna as corresponding to a valid velocity of the target when respective peaks are identified for the plurality of transmit antennas.

18. The radar system of claim 15, further comprising determining that the radar return is not valid when a peak is identified for fewer than all of the plurality of transmit antennas.

19. The radar system of claim 15, wherein the radar signal transmitted from the plurality of transmit antennas is at least one of time division multiplexed and frequency division multiplexed.

20. The radar system of claim 15, wherein the radar system is configured for at least one of phase-modulated continuous wave (PMCW) operation and orthogonal frequency division multiplexing (OFDM) operation.

* * * * *